United States Patent
Briggs et al.

(10) Patent No.: US 9,816,501 B2
(45) Date of Patent: Nov. 14, 2017

(54) WINDOW OPACITY ATTENUATION USING MICROFLUIDIC CHANNELS

(71) Applicant: INTERNATIONAL BUSINESS MACHINES CORPORATION, Armonk, NY (US)

(72) Inventors: Simon A. S. Briggs, Winchester (GB); James K. Hook, Bristol (GB); Hamish C. Hunt, Ashford (GB); Nicholas K. Lincoln, Stockbridge (GB)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 14/828,559

(22) Filed: Aug. 18, 2015

(65) Prior Publication Data

US 2016/0177939 A1 Jun. 23, 2016

Related U.S. Application Data

(63) Continuation of application No. 14/574,868, filed on Dec. 18, 2014, now Pat. No. 9,567,995.

(51) Int. Cl.
*F04B 49/06* (2006.01)
*G05D 7/06* (2006.01)
(Continued)

(52) U.S. Cl.
CPC .............. *F04B 49/065* (2013.01); *E06B 7/28* (2013.01); *F04B 19/006* (2013.01); *G01J 1/42* (2013.01);
(Continued)

(58) Field of Classification Search
CPC B60J 3/04; E06B 37/28; F04B 19/006; F04B 49/065; G01J 1/42; G02B 26/004; G02B 26/02; G05D 7/0629
See application file for complete search history.

(56) References Cited

U.S. PATENT DOCUMENTS 5,390,045 A 2/1995 Bernard, Jr.
5,781,343 A 7/1998 Cook
(Continued)

FOREIGN PATENT DOCUMENTS

WO 8803518 5/1988

OTHER PUBLICATIONS

D. Park et al., "Dynamic Daylight Control System Implementing Thin Cast Arrays of Polydimethylsiloxane-based Millimeter-scale Transparent Louvers", Elsevier Ltd., Building and Environment, vol. 82, 2014, pp. 87-96.

(Continued)

*Primary Examiner* — Francis M Legasse, Jr.
(74) *Attorney, Agent, or Firm* — Law Office of Jim Boice

(57) ABSTRACT

A window has a pane of transparent material. A first set of microfluidic channels pass through a first area of the pane, and a second set of microfluidic channels pass through a second area of the pane. Microfluidic planes are in fluid communication with the first and second sets of microfluidic channels. A first pump is in fluid communication with the first set of microfluidic channels, and selectively moves a first fluid having a first level of opacity through the microfluidic planes via the first set of microfluidic channels. A second pump is in fluid communication with the second set of microfluidic channels, and selectively moves a second fluid having a second level of opacity through the microfluidic planes via the second set of microfluidic channels. Moving the second fluid into the microfluidic planes pushes the first fluid out of the microfluidic planes, thereby adjusting an opacity of the window.

5 Claims, 2 Drawing Sheets

(51) Int. Cl.
| | |
|---|---|
| *E06B 7/28* | (2006.01) |
| *G01J 1/42* | (2006.01) |
| *G02B 26/00* | (2006.01) |
| *G02B 26/02* | (2006.01) |
| *F04B 19/00* | (2006.01) |
| *B60J 3/04* | (2006.01) |
| *E06B 9/24* | (2006.01) |

(52) U.S. Cl.
CPC ........... *G02B 26/004* (2013.01); *G02B 26/02* (2013.01); *G05D 7/0629* (2013.01); *B60J 3/04* (2013.01); *E06B 2009/2405* (2013.01); *E06B 2009/2464* (2013.01)

(56) References Cited

U.S. PATENT DOCUMENTS

| | | | |
|---|---|---|---|
| 6,457,286 | B1 | 10/2002 | Eliyahu et al. |
| 8,432,600 | B2 * | 4/2013 | Brown .................... B60R 1/088 359/263 |
| 8,573,195 | B2 | 11/2013 | Cavalheiro et al. |
| 9,085,929 | B2 | 7/2015 | Johnson |
| 2007/0251164 | A1 | 11/2007 | Egeresi |
| 2008/0163570 | A1 | 7/2008 | Matoses Vercher et al. |
| 2010/0161177 | A1 | 6/2010 | Yuter |
| 2012/0038587 | A1 | 2/2012 | Alford |
| 2014/0204452 | A1 | 7/2014 | Branson |

OTHER PUBLICATIONS

Anonymous, "Pumps from Cole-Parmer United Kingdom", Cole-Parmer Instrument Company, LLC, coleparmer.co.uk, retrieved Sep. 24, 2014, pp. 1-4.

Anonymous, "Smart Glass", Wikimedia Foundation, Inc., wikipedia.org, last modified Sep. 19, 2014, retrieved Sep. 24, 2014, pp. 1-10.

Anonymous, "Electronic Switchable Glass: Privacy Glass", Smartglass International Limited, smartglassinternational.corn, retrieved Sep. 24, 2014, pp. 1-3.

Anonymous, "Switchable Glass", Shepway Glass, shepwayglass.co.uk, retrieved Sep. 24, 2014, pp. 1-4.

A. Wodoslawsky, "Focusing of Maskless Abrasive Jets", University of Toronto, Graduate Dept of Mechanical and Industrial Engineering, 2010, pp. 1-132.

B. Hatton et al., "An Artificial Vasculature for Adaptive Thermal Control of Windows", Elsevier, Solar Energy Materials and Solar Cells, vol. 117, Oct. 2013, pp. 429-436. (Abstract Only).

List of IBM Patents or Patent Applications Treated As Related—Aug. 12, 2015, pp. 1-2.

* cited by examiner

U.S. 9,816,501 B2

WINDOW OPACITY ATTENUATION USING MICROFLUIDIC CHANNELS

BACKGROUND

The present disclosure relates to the field of transparent materials, and specifically to adjusting the opacity of transparent materials. Still more specifically, the present invention relates to adjusting the opacity of transparent materials using immiscible liquids within microfluidic channels in transparent materials.

SUMMARY

In one or more embodiments of the present invention, a physical window has a pane of transparent material. A first set of microfluidic channels pass through a first area of the pane, and a second set of microfluidic channels pass through a second area of the pane. A plurality of microfluidic planes are in fluid communication with the first and second sets of microfluidic channels. A first pump is in fluid communication with the first set of microfluidic channels, and selectively moves a first fluid having a first level of opacity through the microfluidic planes via the first set of microfluidic channels. A second pump is in fluid communication with the second set of microfluidic channels, and selectively moves a second fluid having a second level of opacity through the microfluidic planes via the second set of microfluidic channels. Thus, moving the second fluid into the microfluidic planes pushes the first fluid out of the microfluidic planes to adjust an opacity of the physical window.

In one or more embodiments of the present invention, a transportation vehicle includes a physical window. The physical window has a pane of transparent material. A first set of microfluidic channels pass through a first area of the pane, and a second set of microfluidic channels pass through a second area of the pane. A plurality of microfluidic planes are in fluid communication with the first and second sets of microfluidic channels. A first pump is in fluid communication with the first set of microfluidic channels, and selectively moves a first fluid having a first level of opacity through the microfluidic planes via the first set of microfluidic channels. A second pump is in fluid communication with the second set of microfluidic channels, and selectively moves a second fluid having a second level of opacity through the microfluidic planes via the second set of microfluidic channels. Thus, moving the second fluid into the microfluidic planes pushes the first fluid out of the microfluidic planes to adjust an opacity of the physical window.

In one or more embodiments of the present invention, a method adjusts an opacity of a physical window. One or more processors receive light data, from a photosensor, that describes a quantity of light that is striking a physical window. The physical window has a pane of transparent material, a first set of microfluidic channels that pass through a first area of the pane, a second set of microfluidic channels that pass through a second area of the pane, and microfluidic planes that are in fluid communication with the first and second sets of microfluidic channels. A first pump is in fluid communication with the first set of microfluidic channels, selectively moves a first fluid having a first level of opacity through the microfluidic planes via the first set of microfluidic channels. A second pump is in fluid communication with the second set of microfluidic channels, selectively moves a second fluid having a second level of opacity through the microfluidic planes via the second set of microfluidic channels. Thus, moving the second fluid into the microfluidic planes pushes the first fluid out of the microfluidic planes to adjust an opacity of the physical window. Operation of the first and second pumps is controlled by actuators. Thus, one or more processors transmit a first electrical control signal to a first actuator and a second electrical signal to a second actuator based on the light data from the photosensor. The first electrical control signal directs the first actuator to activate the first pump in order to cause fluid to flow in a first direction through the microfluidic planes in the physical window. The second electrical control signal directs the second actuator to activate the second pump in order to cause fluid to flow through a second direction in the microfluidic planes in the physical window. Thus, fluid changes within the microfluidic planes change an opacity of the physical window.

DETAILED DESCRIPTION

Figure 1:
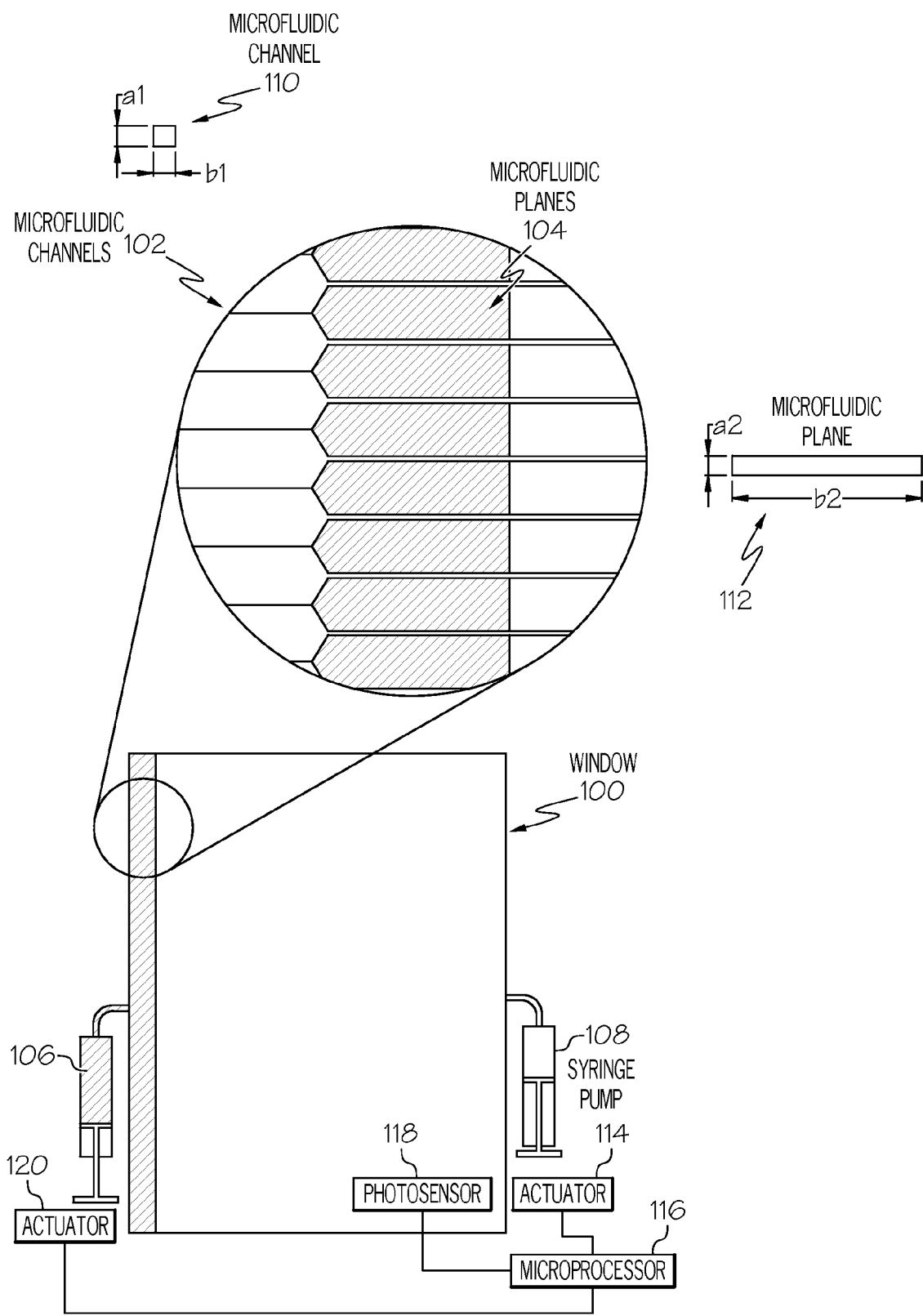
FIG. 1 depicts an exemplary physical window having adjustable opacity due to immiscible liquids being pumped through a system of microchannels within the physical window.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and particularly to FIG. 1, one or more embodiments of an exemplary novel window 100 in accordance with the present invention are presented. Window 100 is a physical window that, as described herein, selectively allows more or less light to pass through. The adjustably transparent structure of window 100 may be composed of any transparent material, including glass, thermoplastic polymers such as polycarbonates, etc. In the present disclosure, the term "pane" is defined as a sheet of any such transparent material, as used in a window such as window 100.

In various embodiments of the present invention, window 100 is mounted within a frame of a building (residential or commercial or industrial), within a frame on a transportation vehicle (i.e., a car, an aircraft, a boat, etc.), within a frame on a container (e.g., a laboratory hood, a sandblasting cabinet, etc.), within a welding hood, etc. The features of the window 100 described below in the context of a window in a building are applicable to any implementation and/or use of the presently described and novel window 100.

For purposes of initial illustration, assume that window 100 is a glass window, which is mounted in a window frame in a building. As shown in FIG. 1, etched within the glass are microfluidic channels 102, which are in fluid connection with microfluidic planes 104. As depicted in FIG. 1, the microfluidic channels provide enclosed channels that allow fluids to enter and exit the enclosed microfluidic planes 104. For purposes of illustration, assume that the microfluidic planes 104 cover all (or at least 95%) of the area of window 100, such that the opacity/transparency properties of whatever fluid is within the microfluidic planes 104 will determine how opaque/transparent window 100 is to light. That is, if dark/reflective fluids are in the microfluidic planes 104, then the window will prevent light from passing through. If light/clear fluids are in the microfluidic planes 104, then the window will allow light to pass through.

For example, an opaque material from pump 106 can be pumped into microfluidic channels 102 shown at the left side of the window 100, which lead into the microfluidic planes 104 (which preferably extend from one side of the window to the other). This forces the opaque material to be pumped into the microfluidic planes 104 from left to right in FIG. 1. Likewise, transparent material from pump 108 can be pumped though similar microfluidic channels on the right side of the window 100 (not shown), causing the transparent material to be pumped into the microfluidic planes 104 from right to left in FIG. 1.

Microfluidic channels 102 and/or microfluidic planes 104 exhibit, as their names imply, microfluidic properties. Microfluidics describes the behavior of fluids when flowing through extremely small spaces. When a fluid flows through a very small space (e.g., wherein the height of the microfluidic channels 102 and/or microfluidic planes 104 is between 100 nanometers and a few hundred micrometers), fluid dynamics are different as compared to the behavior of fluids in larger channels (e.g., enclosed channels that have a height greater than 1 millimeter). Specifically, in such small spaces, the effect of momentum of a fluid compared to the effect of viscosity (known as the "Reynolds number") drops radically. As a consequence of the change in fluid dynamics properties, fluids tend to flow across the surface of the microfluidic channels 102 and/or microfluidic planes 104 as "laminar flow", rather than roiling about due to "turbulent flow" (as found in large channels). Since there is no roiling/turbulence, when two fluids meet head-on (as when fluid from pump 106 meets fluid from pump 108 in the microfluidic planes 104 shown in FIG. 1), they resist mixing together since there is no turbulence at their interface. Thus, microfluidic channels 102 and/or microfluidic planes 104 provide the environment in which fluids are able to be displaced with only minimum, if any, cross-contamination (i.e., the two fluids do not mix together).

In one or more embodiments of the present invention, avoiding cross-contamination of fluids is augmented by the use of fluids that are immiscible (i.e., have physical properties that resist being combined), such as oil and water. In one or more embodiments of the present invention, at least one of the fluids selected for use in the window 100 are able to support suspended particles that have particular optical features (e.g., are reflective, block/absorb light, etc.).

With reference again to FIG. 1, an exemplary cross-section of one of the microfluidic channels 102 is shown in cross-section 110. The dimension of a1 is preferably less than 100 micrometers. More specifically and in one or more preferred embodiments of the present invention, the dimension of a1 is in the range of 50-100 micrometers. Similarly, the dimension of b1 is preferably in the range of 50-100 micrometers. These preferred dimensions for a1 and b1 preserve microfluidic properties for laminar flow (no turbulence) of fluids passing through the microfluidic channels 102.

An exemplary cross-section of one of the microfluidic planes 104 is shown in cross-section 112. In one or more preferred embodiments of the present invention, a2 is preferably less than 100 micrometers. More specifically and in one or more preferred embodiments of the present invention, the dimension of a2 is in the range of 50-100 micrometers. Similarly, the dimension of b2 is preferably in the range of 100-500 micrometers. These preferred dimensions for a2 and b2 preserve microfluidic properties for laminar flow (no turbulence) of fluids passing through the microfluidic planes 104.

There is flexibility in the dimensions shown for cross section 110 and cross section 112. That is, larger dimensions and higher tolerance may be possible, depending on the material used to construct the window 100 and its microfluidic channels 102 and/or microfluidic planes 104.

Fabricating the microfluidic channels 102 and/or the microfluidic planes 104 can be accomplished by various processes, including but not limited to, "micro-blasting" or etching.

"Micro-blasting" functions in a manner similar to that of sand blasting, except that the abrasive material used is much finer than sand, and the blasting jet is much smaller than that used in sand blasting. By directing ultra-fine abrasives from a high-velocity jet controlled by a computer aided manufacturing (CAM) system, material from the glass is precisely removed, leaving the microfluidic channels 102 and/or microfluidic planes 104 behind.

"Etching" uses chemicals that are precisely applied, preferably with a mask, to the glass. By controlling the position, amount, and time that the chemicals are left on the glass, the glass material is "dissolved" and then washed away, leaving the microfluidic channels 102 and/or microfluidic planes 104 behind.

In order to create an enclosed channel to define the microfluidic channels 102 and/or microfluidic planes 104, two sheets of glass can be micro-blasted or etched as just described, and then the two sheets laminated together to form the enclosed microfluidic channels 102 and/or microfluidic planes 104. Alternatively, a laminate covering (e.g., a sheet of transparent polymer having the same laminar properties as the glass) can be applied on top of a single etched/blasted sheet of glass, thus forming the enclosed microfluidic channels 102 and/or microfluidic planes 104.

As shown in FIG. 1, fluid being pumped into the microfluidic channels 102 and microfluidic planes 104 adjusts opacity of the window 100 according the optical properties of the fluid. Opacity of the fluid is caused by several phenomena, including reflection, scattering, and absorption of light. That is, the fluid may cause the light to bounce straight back to the source (reflection), be redirected in other directions (scattering), and/or be converted into heat (absorption).

In one embodiment of the present invention, the scattering of light may be elastic or inelastic. In elastic scattering of light, all light that strikes a fluid (and/or suspended particles within a fluid) is reflected off the fluid/particles. In inelastic scattering of light, some of the light is reflected by the fluid/particles, while some of the light is absorbed by the fluid/particles and converted into heat.

For purposes of illustration, assume that the fluid being pumped from pump 106 has a high opacity, such that 80-100% attenuation (e.g., blocking) of light occurs. Similarly, assume that the fluid being pumped from pump 108 has a low opacity (such that less than 5% attenuation of light occurs). That is, if fluid from pump 106 fills all of the microfluidic planes 104 (which extend across all of the window 100), then there will be 80-100% light blockage (opacity) by the window. However, if fluid from pump 108 fills all of the microfluidic planes 104, then there will be less than 5% light blockage (opacity) by the window.

Assume now that a decision is made to increase the opacity of window 100, thereby decreasing how much light can pass through window 100. Pumping the highly opaque fluid from pump 106 into the microfluidic channels 102 and microfluidic planes 104 prevents 80-100% of light striking the window 100 from passing through. If a decision is made to decrease the opacity of window 100 (thus increasing how much light is able to pass through window 100), then pumping the highly transparent fluid from pump 108 into the microfluidic channels 102 and microfluidic planes 104 prevents only 5% of light striking the window 100 from passing through (thus allowing 95% of the light to pass through window 100).

Due to the microfluidic behavior within the microfluidic planes 104, there is minimal, if any, mixing of the fluids from pump 106 and pump 108 within the microfluidic planes 104. In order to minimize this fluid mixing further, fluids used by pump 106 and pump 108 are selected for their mutual immiscibility (inability to mix together). Examples of fluid pairs that have a high degree of mutual immiscibility include, but are not limited to, acetonitrile and heptane, cyclohexane and methyl alcohol, pentane and dimethyl sulfoxide, etc. That is, any pairs of hydrocarbons with chemical properties (e.g., disparate polarities, disparate molecular weights, etc.) that discourage mixing (miscibility) can be used. However, for health and safety concerns, less toxic pairs, such as water and ethyl acetate, are preferable. For example, the transparent liquid in pump 108 may be water, while pump 106 may transport ethyl acetate that contains suspended dyes, reflective particles, etc.

Pumps 106 and 108 are depicted as syringe pumps in FIG. 1, since syringe pumps provide a preferred embodiment for moving fluids into and out of microfluidic channels 102 and/or microfluidic planes 104. However, in other embodiments, one or both of pump 106 and pump 108 may be a peristaltic pump (in which fluid is pressed through a tube with rotating rollers), a piston pump (in which fluid is drawn through inlet/outlet valves in a cylinder and forced out by a piston within the cylinder), a centrifugal pump (in which impellers move fluid outward to a diffuser chamber), etc.

In a preferred embodiment, fluid exchange (i.e., in which fluid from pump 106 in the microfluidic channels 102 and/or microfluidic planes 104 is replaced with fluid from pump 108 or vice versa) is preferably accomplished within a time that is in the range of 10-120 seconds. This provides prompt opacity transitions (from darkened to clear) of the window 100, while avoiding cavitation (bubbling) that may occur if fluid is forced too quickly through the microfluidic channels 102 and/or microfluidic planes 104 (even with their microfluidic properties). If two pumps are not able to provide this time performance, then more pumps in fluid communication with microfluidic channels 102 and/or microfluidic planes 104 are added.

Note that the window 100 presented in FIG. 1 may be used in various environments, and thus its design and features can be adjusted accordingly.

For example, when used on a building, the opacity window 100 can be adjusted to adjust to temperature conditions, the time of day, seasons, etc., such that the use of fluid from pump 106 and pump 108 is adjusted accordingly.

When used on a transportation vehicle such as a car, other factors are responded to when adjusting the window's opacity, such as adjusting the opacity according to driving conditions (e.g., rain), personal traits of the driver (e.g., a driver with poor night vision would not darken the car's windows at night), etc.

In one or more embodiments of the present invention, control of the pumps 106 and 108 is achieved by a mechanical actuator (e.g., control motor). For example, consider actuator 114, which controls the operation of pump 108. In one embodiment, actuator 114 is controlled by a microprocessor 116, which receives signals from a photosensor 118. Photosensor 118 is any device capable of detecting and quantifying light, such as a photodiode, a photoresistor, a charge-coupled device (CCD), a photovoltaic cell, a phototransistor, etc. Photosensor 118 detects how much light is striking the surface of window 100. If the amount of light detected by photosensor 118 drops below a predefined value (as determined by values stored within a controlling microprocessor 116, and set according to rules, user profiles, user-selected values, etc.), then pump 108 is activated, thereby pushing clear fluid into microfluidic channels 102 and/or microfluidic planes 104. However, if the amount of light detected by photosensor 118 exceeds the same or another predefined value, then the microprocessor 116 directs actuator 120 to cause pump 106 to pump its opaque fluid into microfluidic channels 102 and/or microfluidic planes 104.

Thus, FIG. 1 depicts one or more exemplary embodiments of a novel physical window (window 100). The physical window includes a pane (i.e., a sheet) of transparent material, such as glass or other transparent material, such as a polycarbonate. A first set of microfluidic channels (shown as microfluidic channels 102 in the left side of the expanded view of the window 100 in FIG. 1) extends through a first area (e.g., the left side) of the pane. A second set of microfluidic channels (on the left side of the window 100 in FIG. 1, but not shown in the expanded view) pass through a second area (e.g., the right side) of the pane. A plurality of microfluidic planes (microfluidic planes 104 in FIG. 1) are in fluid communication with the first and second sets of microfluidic channels. A first pump (e.g., syringe pump 106 shown in FIG. 1) is in fluid communication with the first set of microfluidic channels. The first pump selectively moves a first fluid (shown by hatching in FIG. 1) that has a first level of opacity through the microfluidic planes via the first set of microfluidic channels. A second pump (e.g., syringe pump 108 in FIG. 1) is in fluid communication with the second set of microfluidic channels, and selectively moves a second fluid (shown lightened in FIG. 1) that has a second level of opacity through the microfluidic planes via the second set of microfluidic channels. Thus, moving the second fluid into the microfluidic planes pushes the first fluid out of the microfluidic planes, thereby adjusting an opacity of the physical window.

In one or more embodiments of the present invention, the physical window is part of a building (e.g., a house, a commercial building, an industrial building), a device (e.g., a lab hood, a sandblasting cabinet, etc.), or a transportation vehicle (land, water, or air).

In one or more embodiments of the present invention, the first fluid from the first pump has opacity in a range of 80-100%, and the second fluid from the second pump has an opacity in a range of less than 5%.

In one or more embodiments of the present invention, the opacity of the first fluid is caused by suspended light absorbing particles in the first fluid, thereby absorbing light that strikes the physical window.

In one or more embodiments of the present invention, the opacity of the first fluid is caused by suspended light reflecting particles in the first fluid, thereby giving the physical window an enhanced reflective property.

In one or more embodiments of the present invention, a photosensor (e.g., photosensor 118 in FIG. 1) detects a level of light striking the physical window. A microprocessor (e.g., microprocessor 116 in FIG. 1) is electrically coupled to the photosensor. The microprocessor receives photosensor signals that describe the level of light striking the physical window. A first actuator (e.g., actuator 120 in FIG. 1) is electrically coupled to the microprocessor and is mechanically coupled to the first pump, while a second actuator (e.g., actuator 114 in FIG. 1), which is also electrically coupled to the microprocessor, is mechanically coupled to the second pump. Thus, the microprocessor, in response to receiving a signal from the photosensor indicating the level of light that is striking the physical window, transmits activation signals to the first actuator and/or the second actuator to selectively activate (or deactivate) the first and/or second pumps.

In one or more embodiments of the present invention, the first pump and the second pump are from a group consisting of a syringe pump, a peristaltic pump, a piston pump, and a centrifugal pump.

Figure 2:
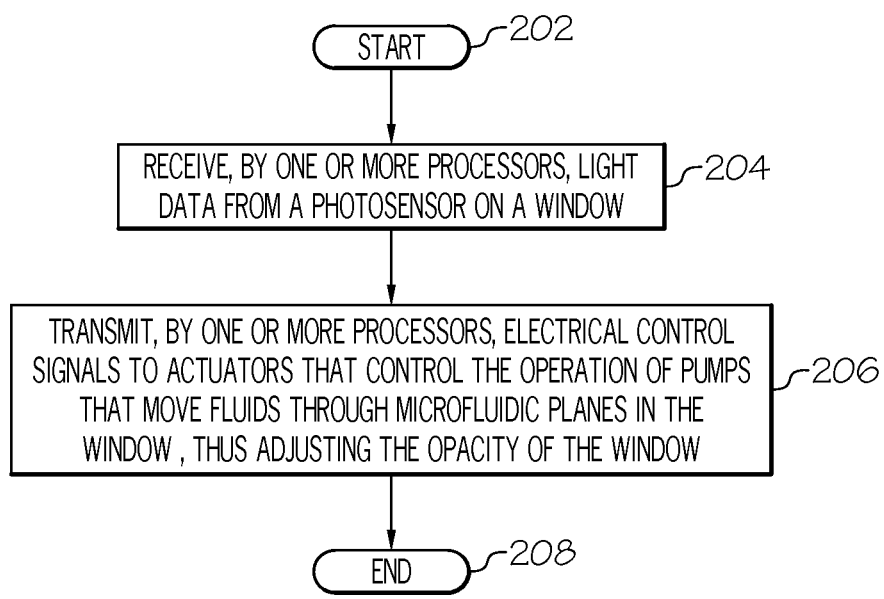
FIG. 2 is a high level flow chart of one or more exemplary steps taken by one or more devices to adjust an opacity of a physical window.

With reference now to FIG. 2, a high level flow chart of one or more exemplary steps taken by one or more devices to adjust an opacity of a window.

After initiator block 202, one or more processors receive light data from a photosensor (block 204). The light data describes a quantity of light that is striking a physical window, which includes a pane of transparent material. A first set of microfluidic channels and a second set of microfluidic channels pass through different areas of the pane. Microfluidic planes are in fluid communication with the first and second sets of microfluidic channels.

A first pump is in fluid communication with the first set of microfluidic channels. The first pump selectively moves a first fluid having a first level of opacity through the microfluidic planes via the first set of microfluidic channels. A second pump is in fluid communication with the second set of microfluidic channels. The second pump selectively moves a second fluid having a second level of opacity through the microfluidic planes via the second set of microfluidic channels. Thus, moving the second fluid into the microfluidic planes pushes the first fluid out of the microfluidic planes to adjust an opacity of the physical window.

In one or more embodiments of the present invention, activating the first pump and/or the second pump is performed manually by a user. That is, in one or more embodiments of the present invention a user manually adjusts the opacity of the physical window by manually operating the first pump 106 and/or the second pump 108 shown in FIG. 1, by activating the actuators 114/120 shown in FIG. 1, by sending a command to the microprocessor 116 shown in FIG. 1, etc.

In one or more embodiments of the present invention, movement of the fluids (by activating the first and/or second pump) is controlled by one or more processors that transmit a first electrical control signal to a first actuator and a second electrical signal to a second actuator based on the light data from the photosensor. The first electrical control signal directs the first actuator to activate the first pump, thus causing fluid to flow in a first direction (e.g., from left to right in FIG. 1) through the microfluidic planes in the physical window. The second electrical control signal directs the second actuator to activate the second pump to cause fluid to flow through a second direction (e.g., from right to left in FIG. 1) in the microfluidic planes in the physical window. This movement of the two immiscible fluids (whose immiscibility is caused by the physical properties of the fluids and/or by the laminar effect caused by the microfluidic dimensions of the microfluidic planes) within the microfluidic planes changes an opacity of the physical window.

Note that the present invention avoids various shortcomings found in the prior art for selectively making a window opaque. Since the microfluidic channels 102 and/or microfluidic planes 104 provide microfluidic properties described herein (e.g., laminar flow, immiscibility, etc.), there is no macrofluidic turbulence caused by larger channels/planes, which often contain air and other causes of cavitation (where a liquid vaporizes). Furthermore, the present invention is immune to ambient vibration (e.g., when used on a transportation vehicle), such that the fluids are much more stable than in systems found in the prior art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described embodiments of the invention of the present application in detail and by reference to illustrative embodiments thereof, it will be apparent that modifications and variations are possible without departing from the scope of the invention defined in the appended claims.

What is claimed is:

1. A method of adjusting an opacity of a physical window, the method comprising:
   receiving, by one or more processors, light data from a photosensor, wherein the photosensor generates the light data, and wherein the light data describes a quantity of light that is striking a physical window, and wherein the physical window comprises:
   a pane of transparent material;
   a first set of microfluidic channels through a first area of the pane;
   a second set of microfluidic channels through a second area of the pane;

a plurality of microfluidic planes in fluid communication with the first and second sets of microfluidic channels;

a first pump in fluid communication with the first set of microfluidic channels, wherein the first pump selectively moves a first fluid having a first level of opacity through the microfluidic planes via the first set of microfluidic channels; and a second pump in fluid communication with the second set of microfluidic channels, wherein the second pump selectively moves a second fluid having a second level of opacity through the microfluidic planes via the second set of microfluidic channels, wherein moving the second fluid into the microfluidic planes pushes the first fluid out of the microfluidic planes to adjust an opacity of the physical window; and transmitting, by one or more processors, a first electrical control signal to a first actuator and a second electrical signal to a second actuator based on the light data from the photosensor, wherein the first electrical control signal directs the first actuator to activate the first pump to cause fluid to flow in a first direction through the microfluidic planes in the physical window, wherein the second electrical control signal directs the second actuator to activate the second pump to cause fluid to flow through a second direction in the microfluidic planes in the physical window, and wherein fluid changes within the microfluidic planes change an opacity of the physical window.

2. The method of claim 1, wherein the first fluid has opacity in a range of 80-100%, wherein the second fluid has opacity in a range of less than 5%.

3. The method of claim 2, wherein the opacity of the first fluid is caused by suspended light absorbing particles in the first fluid.

4. The method of claim 2, wherein the opacity of the first fluid is caused by suspended light reflecting particles in the first fluid.

5. The method of claim 1, wherein the first pump and the second pump are from a group consisting of a syringe pump, a peristaltic pump, a piston pump, and a centrifugal pump.

* * * * *